(12) United States Patent
Griffis et al.

(10) Patent No.: US 11,565,477 B2
(45) Date of Patent: Jan. 31, 2023

(54) TEST ARTICLE FOR ADDITIVE MANUFACTURE AND RELATED METHODS

(71) Applicant: General Electric Company, Schenectady, NY (US)

(72) Inventors: Clay Thomas Griffis, Greenville, SC (US); Steven Charles Woods, Mason, OH (US); Tiffany Muller Craft, Simpsonville, SC (US); Evan John Dozier, Greenville, SC (US); Eric Eicher McConnell, Easley, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/022,259

(22) Filed: Sep. 16, 2020

(65) Prior Publication Data

US 2022/0080667 A1    Mar. 17, 2022

(51) Int. Cl.
*B29C 64/245* (2017.01)
*B29C 64/393* (2017.01)
(Continued)

(52) U.S. Cl.
CPC .............. *B29C 64/393* (2017.08); *B22F 5/10* (2013.01); *B29C 64/245* (2017.08); *B22F 5/003* (2013.01);
(Continued)

(58) Field of Classification Search
CPC ............. B33Y 80/00; Y10T 428/24273; Y10T 428/24479
See application file for complete search history.

(56) References Cited

U.S. PATENT DOCUMENTS

| | | |
|---|---|---|
| 6,193,923 B1 | 2/2001 | Leyden et al. |
| 2009/0138231 A1 | 5/2009 | Little et al. |
| 2010/0174392 A1* | 7/2010 | Fink ............. B29C 64/153 700/212 |

(Continued)

FOREIGN PATENT DOCUMENTS

| | | |
|---|---|---|
| CN | 114266109 A | 4/2022 |
| EP | 3970972 A1 | 3/2022 |

(Continued)

OTHER PUBLICATIONS

European Search Report dated Feb. 9, 2022 for Application No. 21195384.9; pp. 10.

(Continued)

*Primary Examiner* — David Sample
*Assistant Examiner* — Donald M Flores, Jr.
(74) *Attorney, Agent, or Firm* — James Pemrick; Charlotte Wilson; Hoffman Warnick LLC

(57) ABSTRACT

Embodiments of the disclosure provide a test article for additive manufacture and related methods. A test article formed may include a body having a forward face and a rearward face horizontally opposite the forward face. A first surface extending between the forward face and the rearward face of the body may include a plurality of protrusions for removable coupling of the body to a build plate. A second surface on the body may extend between the forward face and the rearward face of the body, and may include a plurality of angled flat surface portions. Each of the plurality of angled flat surface portions may have a distinct angle with respect to a horizontal plane of the body. An angular difference between each adjacent angled flat surface portion in the plurality of angled flat surface portions is substantially uniform.

15 Claims, 9 Drawing Sheets

(51) Int. Cl.
*B22F 5/10* (2006.01)
*B33Y 50/02* (2015.01)
*B33Y 80/00* (2015.01)
*B22F 5/00* (2006.01)

(52) U.S. Cl.
CPC ......... *B22F 2005/005* (2013.01); *B33Y 50/02* (2014.12); *B33Y 80/00* (2014.12); *Y10T 428/24273* (2015.01); *Y10T 428/24479* (2015.01)

(56) References Cited

U.S. PATENT DOCUMENTS

| | | |
|---|---|---|
| 2011/0029114 A1 | 2/2011 | Rose et al. |
| 2014/0300017 A1* | 10/2014 | Wighton ............... B29C 64/118 425/150 |
| 2018/0104742 A1 | 4/2018 | Kottilingam et al. |
| 2020/0111269 A1* | 4/2020 | Danis ..................... G07C 3/143 |
| 2020/0181385 A1 | 6/2020 | Roberson et al. |
| 2020/0269352 A1 | 8/2020 | Maurer et al. |
| 2020/0309466 A1* | 10/2020 | Mayberry ............. B23K 20/10 |

FOREIGN PATENT DOCUMENTS

| | | |
|---|---|---|
| JP | 2022049685 A | 3/2022 |
| WO | 2019091621 A1 | 5/2019 |

OTHER PUBLICATIONS

Kuo, Chil-Chyuan et al.; "A surface quality improvement apparatus for ABS parts fabricated by additive manufacturing"; The International Journal of Advanced Manufacturing Technology; Springer, London; vol. 89; No. 1; Jul. 7, 2016; pp. 635-642.

* cited by examiner

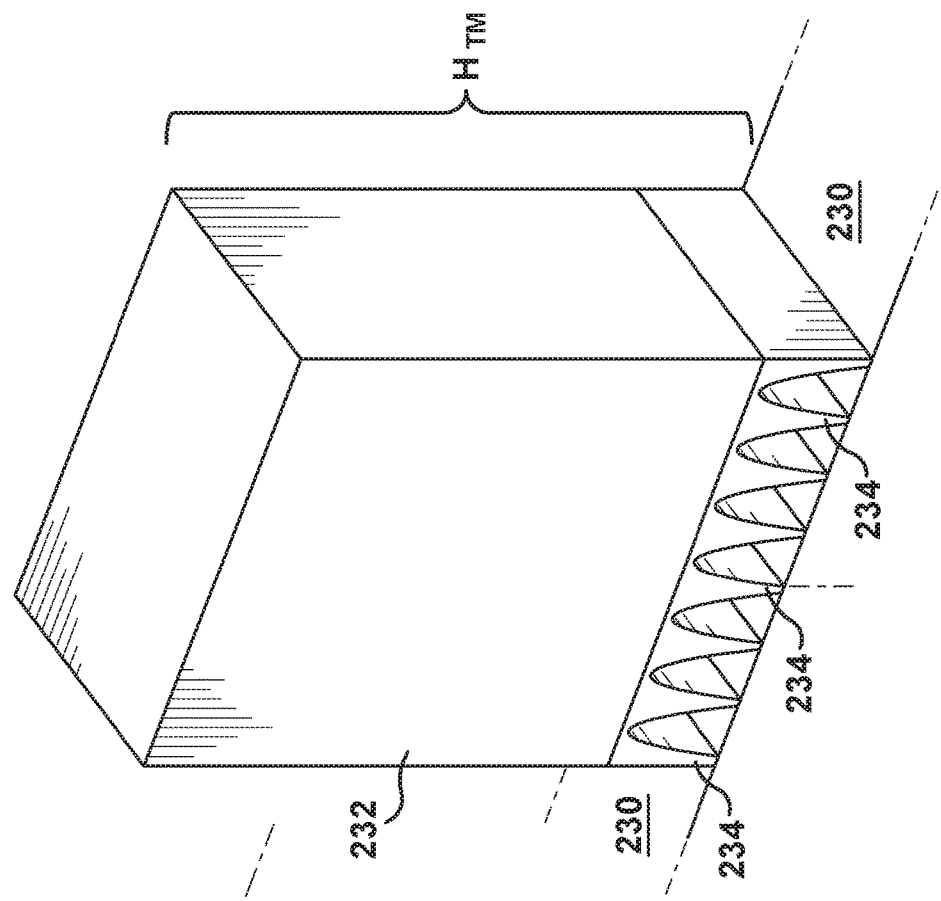
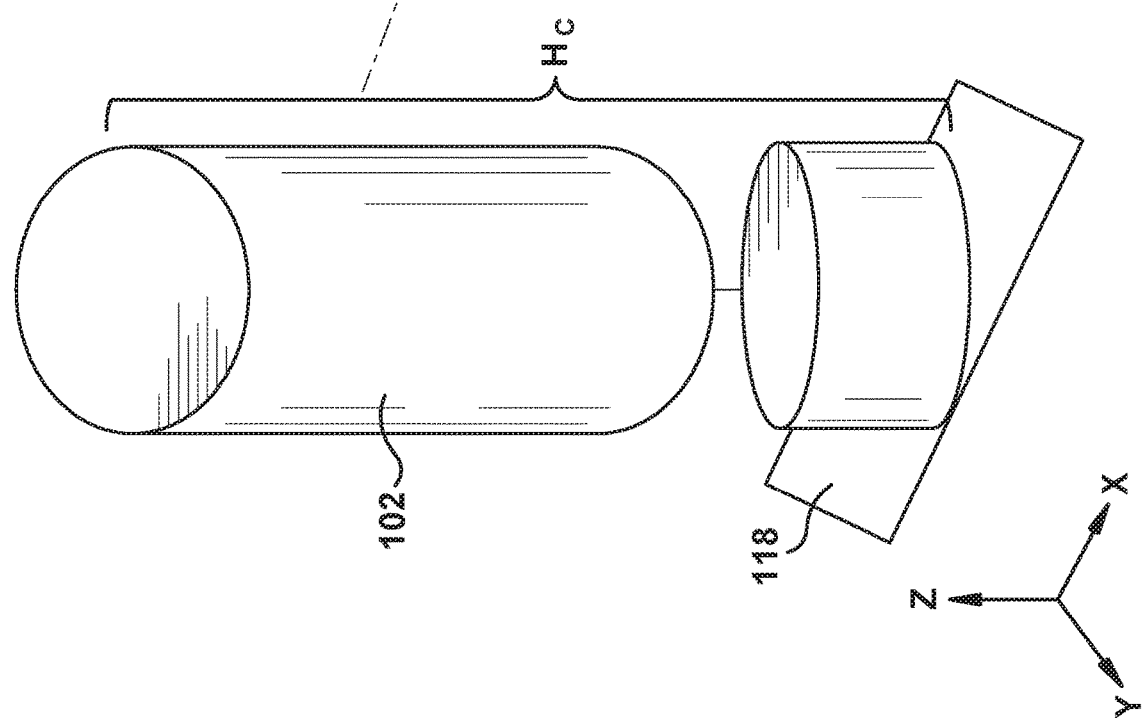
FIG. 5

TEST ARTICLE FOR ADDITIVE MANUFACTURE AND RELATED METHODS

BACKGROUND

Embodiments of the invention relate generally to additive manufacturing techniques. More specifically, embodiments of the disclosure provide a test article and related methods.

Conventional manufacture of metal components generally includes milling or cutting away regions from a slab of material before treating and modifying the cut material to yield a part, which may have been simulated using computer models, e.g., in drafting software. Manufactured components which may be formed from metal can include, e.g., airfoil components for installation in a turbomachine such as an aircraft engine or power generation system. Additive manufacturing (AM) includes a wide variety of processes of producing a component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component. Additive manufacturing techniques typically include taking a three-dimensional computer aided design (CAD) file of the component to be formed, electronically slicing the component into layers, e.g., 18-102 micrometers thick, and creating a file with a two-dimensional image of each layer, including vectors, images or coordinates. The file may then be loaded into a preparation software system that interprets the file such that the component can be built by different types of additive manufacturing systems. In 3D printing, rapid prototyping (RP), and direct digital manufacturing (DDM) forms of additive manufacturing, material layers are selectively dispensed, sintered, melted, formed, deposited, etc., to create the component.

In metal powder additive manufacturing techniques, such as direct metal laser melting (DMLM) (also referred to as selective laser melting (SLM)), metal powder layers are sequentially melted together to form the component. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build plate. The metal powder bed can be moved in a vertical axis. The process takes place in a processing chamber having a precisely controlled atmosphere. Once each layer is created, each two dimensional slice of the component geometry can be fused by selectively melting the metal powder. The melting may be performed by a high power melting beam, such as a 100 Watt ytterbium laser, to fully weld (melt) the metal powder to form a solid metal. The melting beam is moved or deflected in the X-Y direction, and has an intensity sufficient to fully weld (melt) the metal powder to form a solid metal. The metal powder bed may be lowered for each subsequent two-dimensional layer, and the process repeats until the component is completely formed.

Additive manufacturing has proven to be an efficient and effective mechanism for producing highly variable components. However, flaws may arise from the design of a part itself, and/or underlying problems with the additive manufacturing equipment. In many cases, it can be difficult to discern whether defects on a part are caused by issues not pertaining to the original design of the part to be manufactured.

BRIEF DESCRIPTION

Aspects of the disclosure provide a test article formed by additive manufacturing (AM), the test article including: a body having a forward face and a rearward face opposite the forward face; a first surface extending between the forward face and the rearward face of the body, and including a plurality of protrusions for removable coupling of the body to a build plate; and a second surface on the body extending between the forward face and the rearward face of the body, the second surface including a plurality of angled flat surface portions, each of the plurality of angled flat surface portions having a distinct angle with respect to the horizontal plane, wherein an angular difference between each adjacent angled flat surface portion in the plurality of angled flat surface portions is substantially uniform.

Further aspects of the disclosure provide a test article formed by additive manufacturing (AM), the test article including: a body having a forward face and a rearward face opposite the forward face; a first surface on the body extending between the forward face and the rearward face of the body, and including a plurality of protrusions for removable coupling of the body to a build plate; a second surface on the body extending between the forward face and the rearward face of the body, the second surface including a first plurality of angled flat surface portions, each of the first plurality of angled flat surface portions having a distinct angle with respect to the horizontal plane, wherein an angular difference between each adjacent angled flat surface portion in the first plurality of angled flat surface portions is substantially uniform; a third surface on the body extending between the forward face and the rearward face, opposite the first surface; a fourth surface on the body extending between the forward face and the rearward face, opposite the second surface, the fourth surface including a second plurality of angled flat surface portions, each of the second plurality of angled flat surface portions having a distinct angle with respect to the horizontal plane, wherein an angular difference between each adjacent angled flat surface portion in the second plurality of angled flat surface portions is substantially uniform; and at least one curved surface portion on the body between the forward face and the rearward face, and extending between the first surface and one of the second surface or the third surface.

Another aspect of the disclosure provides a method for testing build quality in an additive manufacturing (AM) system, the method including: forming a component with the AM system on a build plate, the component including at least one angled surface portion with respect to the horizontal plane; forming a test article with the AM system on the build plate, wherein the test article includes a body including: a first surface removably coupled to the build plate, and a second surface having a first plurality of angled flat surface portions, each of the first plurality of angled flat surface portions having a distinct angle with respect to the horizontal plane, wherein an angular difference between each adjacent angled flat surface portion in the first plurality of angled flat surface portions is substantially uniform; comparing at least one of the first plurality of angled flat surface portions with a geometric specification of the component; and evaluating whether the component includes a defect, based on the comparing.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 5 shows a perspective view of a density block from a test article, according to embodiments of the disclosure;

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION

As indicated above, the disclosure provides a test article formed by additive manufacturing (AM), and related methods for using the test article to test build quality of an AM system and/or other related parameters. One or more test articles according to embodiments of the disclosure may be manufactured together with one or more components on a single build plate and/or AM system. The component(s) may be assembled for use in an actual device (e.g., turbomachine and/or other piece of mechanical hardware), while the test articles in some cases may serve substantially no practical use in the device. In the case of a turbomachine, the additively manufactured component(s) may include, in various examples, airfoils and/or non-airfoil structures, including wheels, diaphragms, shrouds, etc. The test articles, as a result of being built together with the component(s), will have structural artifacts caused by various settings within the AM system, e.g., flat angled surfaces, curves, openings, etc., that differ from an ideal shape of the test article (stored, e.g., in a geometrical specification as discussed herein).

Embodiments of the disclosure allow an inspector to compare attributes of the additively manufactured test article with various attributes in a geometrical specification, e.g., to determine whether the AM system is miscalibrated, has defective components, etc. Moreover, test articles according to embodiments of the disclosure can also be mounted and analyzed (e.g., using a microscope or other tool) to determine build quality of the materials used for producing a functional part. A notable advantage of producing a test article according to embodiments of the disclosure is that similar defects of the concurrently manufactured component(s) may be detected without visually inspecting the actual component(s). This may be particularly valuable, e.g., where the shape and size of the component(s) make it difficult or impossible to physically inspect their physical attributes. In still further examples, the test article may be placed under stress, disassembled, destroyed, etc., to analyze physical properties of AM component(s) 102 without physically damaging the material of AM component(s) 102.

Figure 1:
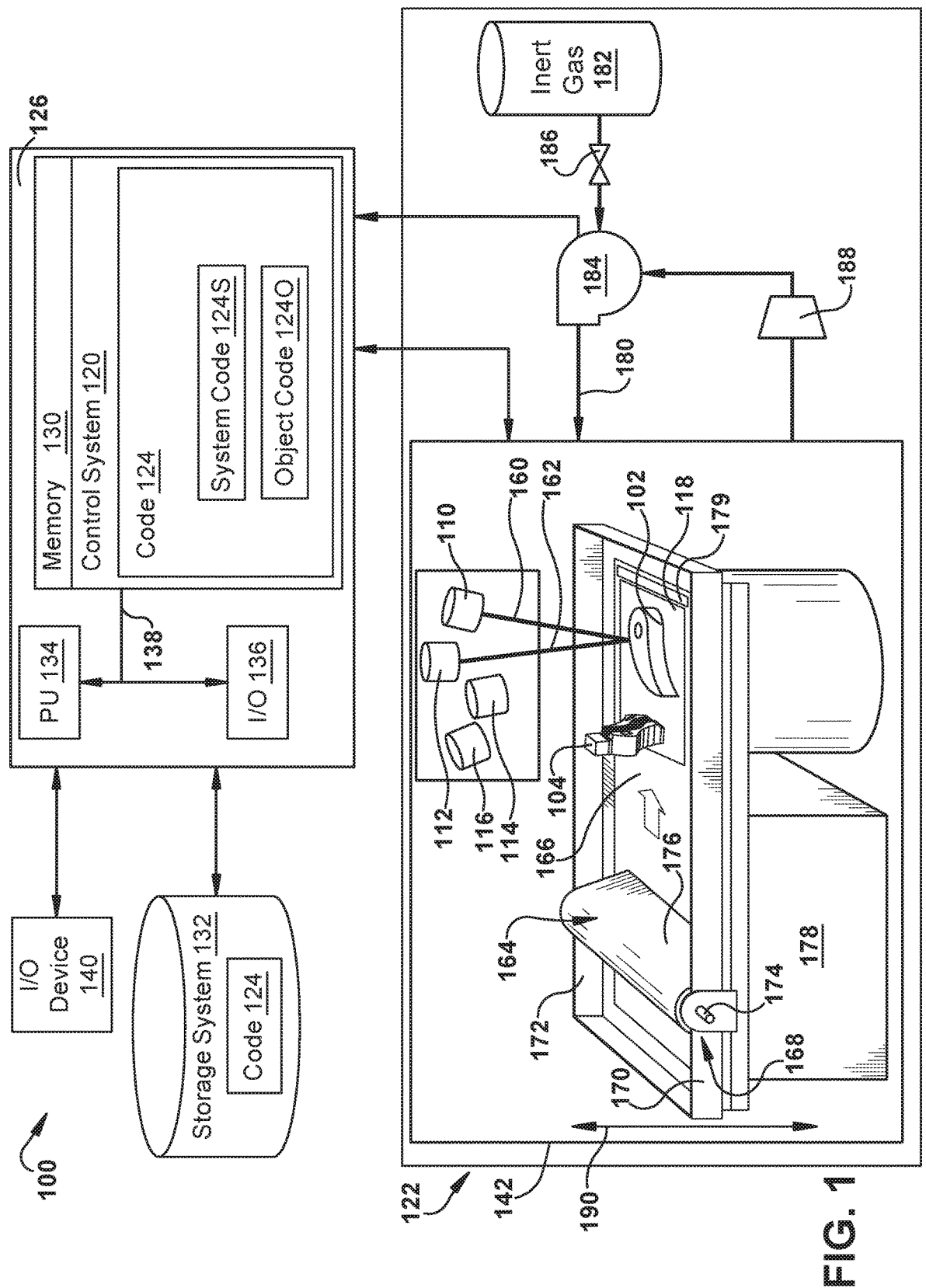
FIG. 1 shows a block diagram of an illustrative additive manufacturing system and process including a non-transitory computer readable storage medium storing code representative of a test article, according to embodiments of the disclosure.

Referring now to the drawings, in which like numerals refer to like elements throughout the several views, FIG. 1 shows a schematic/block view of an illustrative computerized metal powder additive manufacturing system 100 (hereinafter 'AM system 100') for initially generating additively manufactured (AM) component(s) 102, and at least one test article 104. AM component 102 may include one large AM component or multiple AM components, and only one AM component 102 is shown for ease of illustration. Similarly, multiple test articles 104 may be formed with AM system 100 together with one or more AM components 102. The teachings of the disclosure may be applied to any conceivable AM component(s) 102 built using AM system 100. AM system 100 uses multiple melting beam sources, e.g., four lasers 110, 112, 114, 116, but it is emphasized and will be readily recognized that the teachings of the disclosure are equally applicable to build multiple AM components 102 or a single AM component 102 using any number of melting beam sources, i.e., one or more.

In this example, AM system 100 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing. AM component(s) 102 are illustrated in FIG. 1 as elements with the geometrical profile of an airfoil; however, it is understood that the additive manufacturing process can be readily adapted to manufacture any shaped AM component, a large variety of AM components and a large number of AM components having internal openings and formed on a build plate 118.

AM system 100 generally includes a metal powder additive manufacturing control system 120 ("control system") and an AM printer 122. As will be described, control system 120 executes set of computer-executable instructions or program code 124 to generate AM component(s) 102 and test article(s) 104 using multiple melting beam sources 110, 112, 114, 116. In the example shown, four melting beam sources may include four lasers. However, the teachings of the disclosures are applicable to any melting beam source, e.g., an electron beam, laser, etc. Control system 120 is shown implemented on computer 126 as computer program code. To this extent, computer 126 is shown including a memory 130 and/or storage system 132, a processor unit (PU) 134, an input/output (I/O) interface 136, and a bus 138. Further, computer 126 is shown in communication with an external I/O device/resource 140 and storage system 132.

In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the components in computer 126, and I/O device 140 can comprise any device that enables a user to interact with computer 126 (e.g., keyboard, pointing device, display, etc.). Computer 126 is only representative of various possible combinations of hardware and software. For example, processor unit (PU) 134 may comprise a single processing unit, or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computer 126 can comprise any type of computing device such as an industrial controller, a network server, a desktop computer, a laptop, a handheld device, etc.

As noted, AM system 100 and, in particular control system 120, executes program code 124 to generate AM component(s) 102 and/or test article(s) 104. Program code 124 can include, inter alia, a set of computer-executable instructions (herein referred to as 'system code 124S') for operating AM printer 122 or other system parts, and a set of computer-executable instructions (herein referred to as 'object code 124O') defining AM component(s) 102 and/or test article(s) 104 to be physically generated by AM printer 122. As described herein, additive manufacturing processes begin with a non-transitory computer readable storage medium (e.g., memory 130, storage system 132, etc.) storing program code 124. Set of computer-executable instructions for operating AM printer 122 may include any now known or later developed software code capable of operating AM printer 122.

Object code 124O defining AM component(s) 102 and/or test article(s) 104 may include a precisely defined 3D model of an AM component 102 and/or test article(s) 104 and can be generated from any of a large variety of well-known computer aided design (CAD) software systems such as AutoCAD®, TurboCAD®, DesignCAD 3D Max, etc. In this regard, object code 124O can include any now known or later developed file format. Furthermore, object code 124O representative of AM component(s) 102 may be translated between different formats. For example, object code 124O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional AM component to be fabricated on any AM printer. Object code 124O representative of AM component(s) 102 may also be converted into a set of data signals and transmitted, received as a set of data signals and converted to code, stored, etc., as necessary. In any event, object code 124O may be an input to AM system 100 and may come from a part designer, an intellectual property (IP) provider, a design company, the operator or owner of AM system 100, or from other sources. In any event, control system 120 executes system code 124S and object code 124O, dividing AM component(s) 102 and/or test article(s) 104 into a series of thin slices that assembles using AM printer 122 in successive layers of material.

AM printer 122 may include a processing chamber 142 that is sealed to provide a controlled atmosphere for AM component(s) 102 and/or test article(s) 104 printing, e.g., a set pressure and temperature for lasers, or a vacuum for electron beam melting. Build plate 118, upon which AM component(s) 102 and/or test article(s) 104 is/are built, is positioned within processing chamber 142. A number of melting beam sources 110, 112, 114, 116 are configured to melt layers of metal powder on build plate 118 to generate AM component(s) 102 and/or test article(s) 104. While four melting beam sources 110, 112, 114, 116 will be described herein, it is emphasized that the teachings of the disclosure are applicable to a system employing any number of sources, e.g., 1, 2, 3, or 5 or more.

Continuing with FIG. 1, an applicator 164 may create a thin layer of raw material 166 spread out as the blank canvas from which each successive slice of the final AM component will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build plate 118, and a linear actuator 174 such as an electric motor coupled to applicator 164 for moving it along rails 170, 172. Linear actuator 174 is controlled by control system 120 to move applicator 164. Other forms of linear transport systems may also be employed. Applicator 164 may take a variety of forms. In one embodiment, applicator 164 may include a member 176 configured to move along opposing rails 170, 172, and an actuator element (not shown in FIG. 1) in the form of a tip, blade or brush configured to spread metal powder evenly over build plate 118, i.e., build plate 118 or a previously formed layer of AM component(s) 102 and/or test article(s) 104, to create a layer of raw material. The actuator element may be coupled to member 176 using a holder (not shown) in any number of ways.

The process may use different raw materials 166 in the form of metal powder. Raw materials 166 may be provided to applicator 164 in a number of ways. In one embodiment, shown in FIG. 1, a stock of raw material 166 may be held in a raw material source 178 in the form of a chamber accessible by applicator 164. In other arrangements, raw material may be delivered through applicator 164, e.g., through member 176 in front of its applicator element and over build plate 118. In any event, an overflow chamber 179 may be provided on a far side of applicator 164 to capture any overflow of raw material not layered on build plate 118. In FIG. 1, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, AM component(s) 102 and/or test article(s) 104 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., AlSi$_{10}$Mg). In another example, the metal may include a gamma prime hardened superalloy such as but not limited to nickel-based superalloys like Inconel 738, MarM 247 or CM247, or cobalt-based superalloys such as but not limited to those known under their brand names: IN738LC, Rene 108, FSX 414, X-40, X-45, MAR-M509, MAR-M302 or Merl 72/Polymet 972.

The atmosphere within processing chamber 142 is controlled for the particular type of melting beam source being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g. a tank, reservoir or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182, and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer, e.g., a build plate 118 may lower and/or chamber 142 and/or applicator 164 may rise after each layer. Vertical adjustment system 190 may include any now known or later developed linear actuators to provide such adjustment that are under the control of control system 120.

In operation, build plate 118 with metal powder thereon is provided within processing chamber 142, and control system 120 controls the atmosphere within processing chamber 142. Control system 120 also controls AM printer 122, and in particular, applicator 164 (e.g., linear actuator 174) and melting beam source(s) 110, 112, 114, 116 to sequentially melt layers of metal powder on build plate 118 to generate AM component(s) 102 and/or test article(s) 104 according to embodiments of the disclosure. As noted, various parts of AM printer 122 may vertically move via vertical adjustment system 190 to accommodate the addition of each new layer, e.g., a build plate 118 may lower and/or chamber 142 and/or applicator 164 may rise after each layer.

Figure 2:
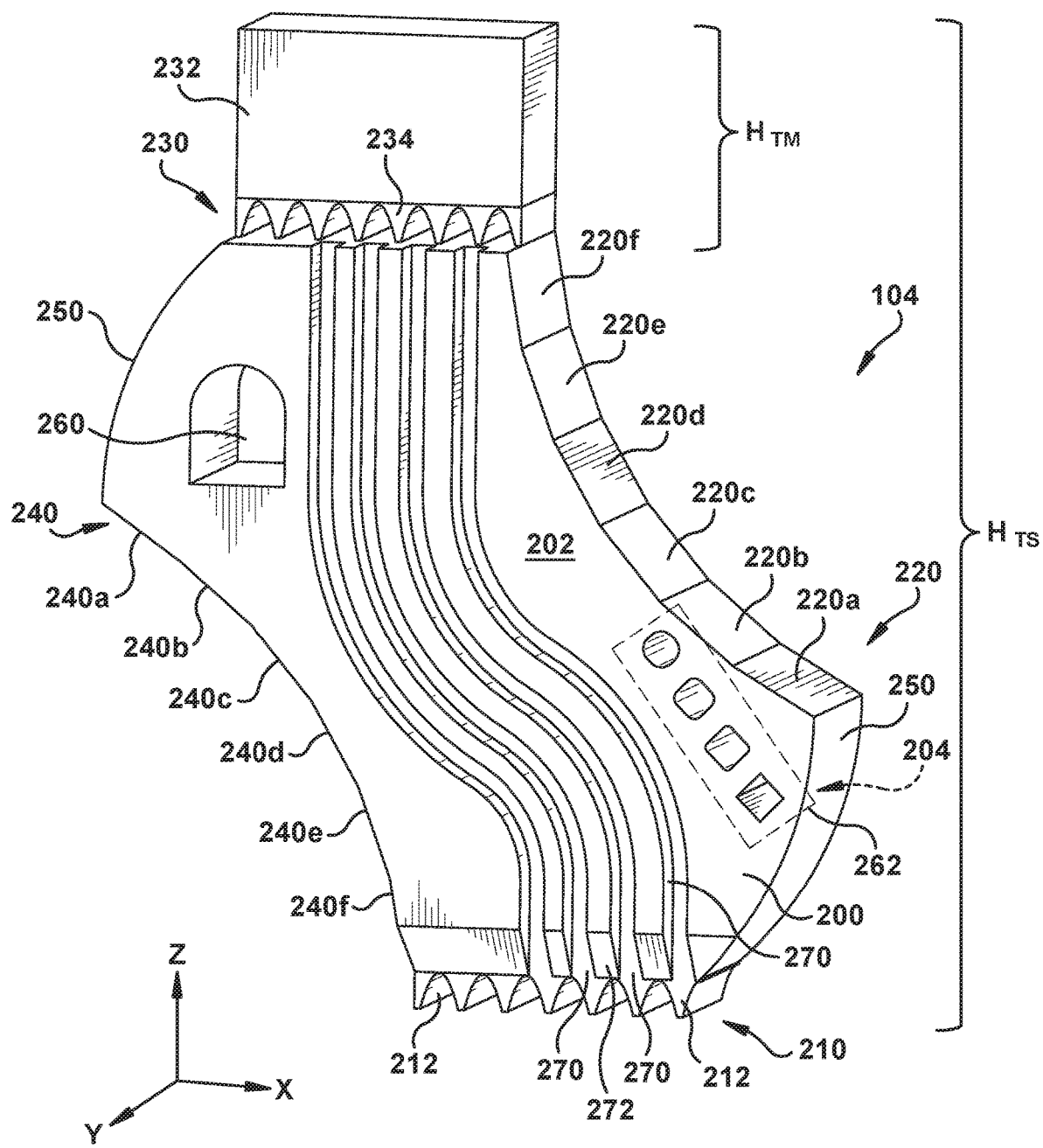
FIG. 2 shows a first perspective view of a test article, according to embodiments of the disclosure.
Figure 3:
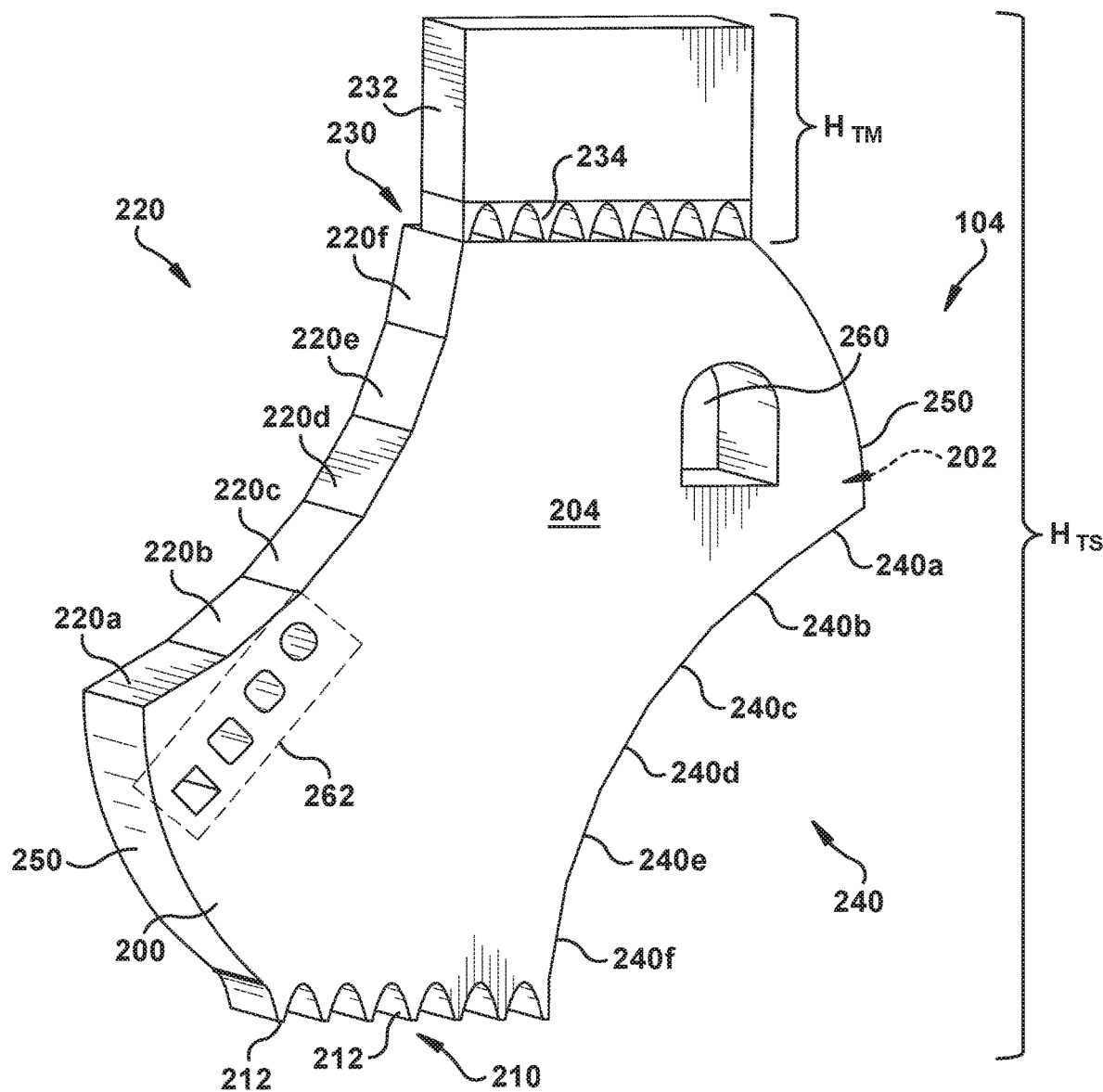
FIG. 3 shows a second perspective view of a test article, according to embodiments of the disclosure.
Figure 4:
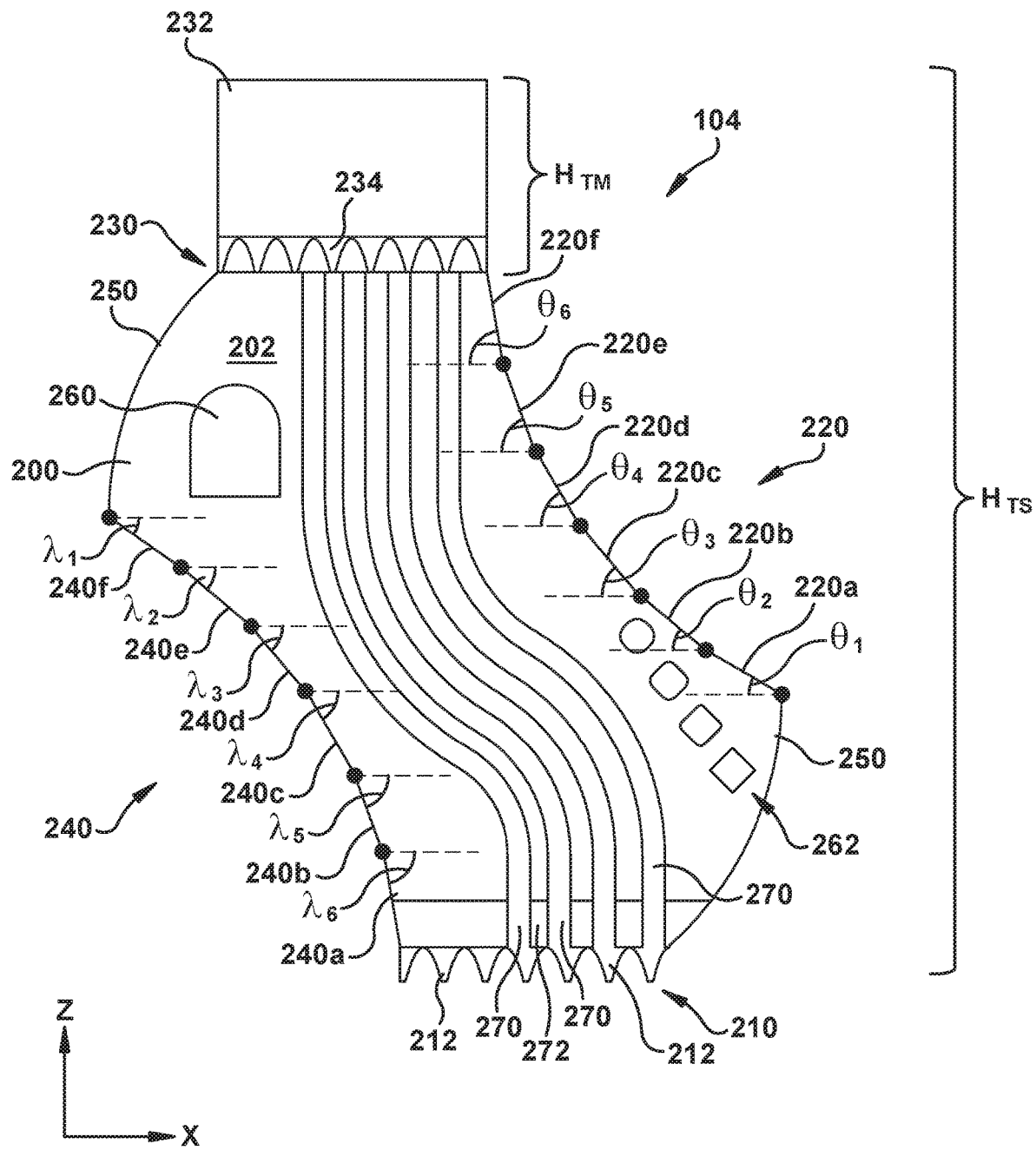
FIG. 4 shows a plan view of a test article, according to embodiments of the disclosure.
Figure 6:
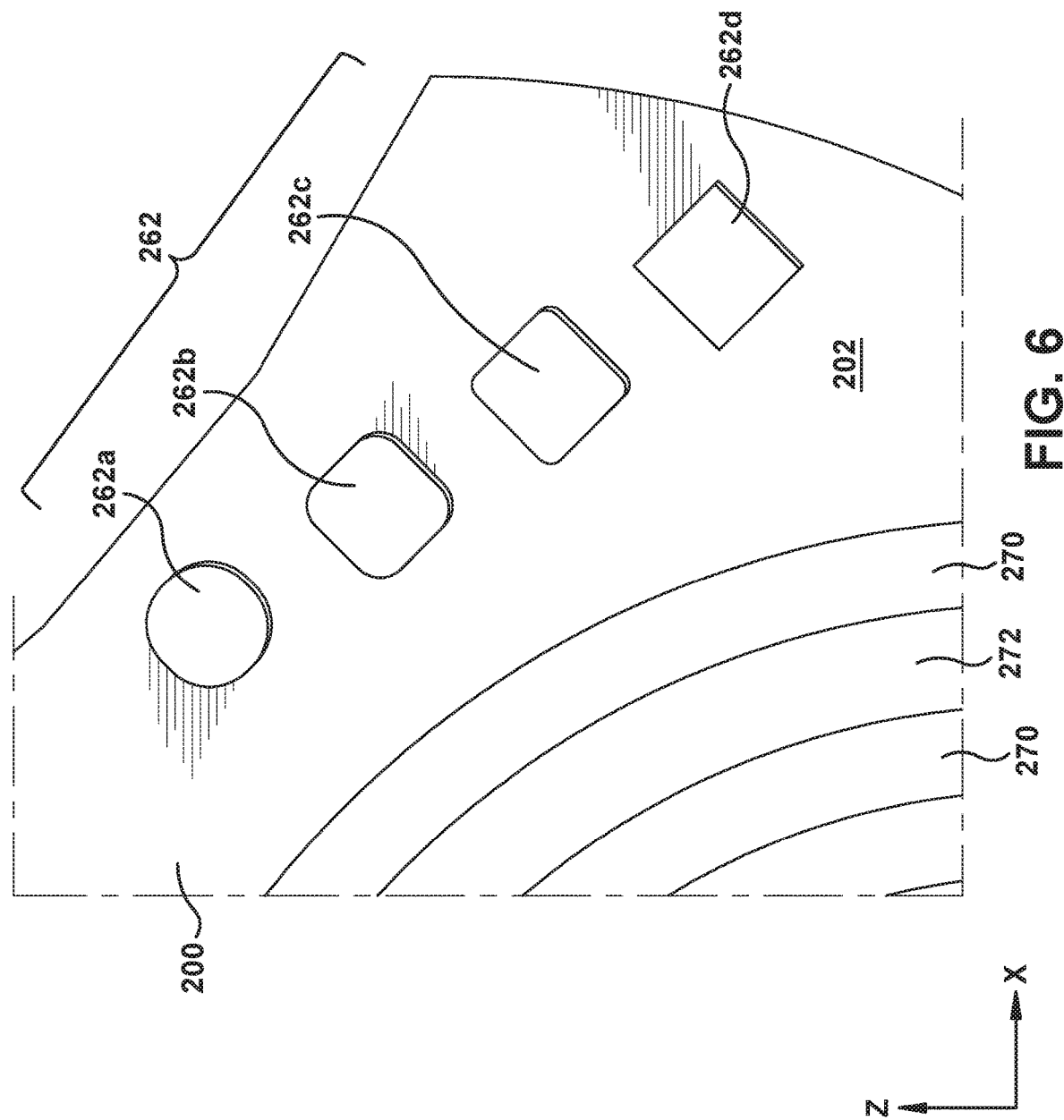
FIG. 6 shows an expanded plan view of sample radii windows in a test article, according to embodiments of the disclosure.

Referring now to FIGS. 2-4, embodiments of a test article 104 is shown according to embodiments of the disclosure. Front and back perspective views of test article 104 are shown in X-Y-Z space within FIGS. 2 and 3, respectively. FIG. 4 provides a plan view of test article 104 in the X-Z plane, with additional annotations to depict certain geometric features. Test article 104 may be formed by additive manufacturing (AM) as described elsewhere herein, and may be formed concurrently with AM component(s) 102 (FIG. 1). Test article 104 may be a distinct structure from AM component(s) 102, and may include various geometrical features for analyzing the build quality of AM component(s) 102 formed on the same build plate (e.g., build plate 118) as test article 104.

Test article 104 may include a body 200 with a forward face 202 oriented toward a first direction (e.g., the positive Y direction in FIGS. 2-4), and a rearward face 204 oriented toward a second direction (e.g., the negative Y direction in FIGS. 2-4). For the purposes of explanation, the term "forward" denotes the positive Y direction, "rearward" denotes the negative Y direction, "horizontal" refers to the direction of the X axis, and "vertical" refers to the direction of the Z axis. It is understood that these terms may be interchanged and/or substituted, based on the perspective from which test article 104 is viewed. Body 200 may be made by any metal powder additive manufacturing process, such as that described relative to FIG. 1. Body 200 and its various components discussed herein may be made using any of the above-described metal powders. Such materials may be used in conjunction with, or as a substitute for, one or more of the various example laser-sinterable metals and/or other additively manufactured materials discussed elsewhere herein. In such cases, body 200 may include aluminum, titanium, nickel, cobalt, iron, and/or other currently known or later developed metals. Cast metals may also include one or more of stainless steel, steel-based composite materials, alloys, superalloys, and/or other materials, which may be formed by casting.

Body 200 of test article 104 may include various structural features for testing build quality, e.g., of AM component 102 in AM system 100, based on physical attributes of test article 104. For instance, test article 104 may include a first surface 210 on body 200, e.g., a lowermost vertical surface, extending between forward face 202 and rearward face 204. First surface 210 may include multiple protrusions 212 for removable coupling of body 200 to build plate 118 (FIG. 1). Each protrusion 212 may be formed, e.g., by forming multiple thin supports of additively manufacturable material with openings therebetween, to allow body 200 to be removed more easily removed from build plate 118 thereunder. Thus, when test article 104 is formed using AM system 100, body 200 may be removably coupled to build plate 118 at first surface 210.

Body 200 may include a second surface 220 extending between forward face 202 and rearward face 204 of body 200. Second surface 220 may include, and in some cases may be defined by, a first plurality of angled flat surface portions (identified separately as 220a, 220b, 220c, 220d, 220e, 220f, respectively). Although six angled flat surface portions 220a, 220b, 220c, 220d, 220e, 220f are provided as an example in FIGS. 2-4, it is understood that as few as two angled flat surface portions, or several dozen or more angled flat surface portions, may be formed within second surface 220 of test article 104. Angled flat surface portions 220a, 220b, 220c, 220d, 220e, 220f may be considered "flat" by being substantially planar, i.e., having a two-dimensional structure and by having substantially no component in the direction normal to their two-dimensional plane. It is thus understood that each angled flat surface portion 220a, 220b, 220c, 220d, 220e, 220f may not be contained entirely within an X-Y, Y-Z, and/or X-Z plane, but may be substantially two-dimensional within respective planes extending at an angle with respect to any or all of these planes.

Referring specifically to FIG. 4, each angled flat surface portion 220a, 220b, 220c, 220d, 220e, 220f may have a distinct angle with respect to the horizontal plane (i.e., the plane of X axis). The distinct angle of each angled flat surface portion 220a, 220b, 220c, 220d, 220e, 220f may be measured with respect to the horizontal axis of body 200. Projections of the horizontal axis of body 200 are shown in phantom for each angled flat surface portion 220a, 220b, 220c, 220d, 220e, 220f that may have a distinct angle ($\Theta_1$, $\Theta_2$, $\Theta_3$, $\Theta_4$, $\Theta_5$, $\Theta_6$) with respect to the horizontal axis. According to a specific example, the angle of each adjacent flat surface portion with respect to the horizontal axis may increase or decrease by a predetermined amount in a sequential fashion.

Each angled flat surface portion 220a, 220b, 220c, 220d, 220e, 220f of test article 104 may indicate the ability of AM system 100 (FIG. 1) to form angled surfaces in AM component 102 (FIG. 1), and the build quality of such surfaces at predetermined angles. According to one example, angles $\Theta_1$, $\Theta_2$, $\Theta_3$, $\Theta_4$, $\Theta_5$, $\Theta_6$ may span from approximately thirty degrees to approximately eighty degrees with respect to the horizontal axis, although other ranges are possible. In the case of a thirty to eighty degree range, each flat surface portion 220a, 220b, 220c, 220d, 220e, 220f may have an angular differential of, e.g., approximately ten degrees with respect to its adjacent portion. In this case, angles $\Theta_1$, $\Theta_2$, $\Theta_3$, $\Theta_4$, $\Theta_5$, $\Theta_6$ may be approximately thirty degrees, forty degrees, fifty degrees, sixty degrees, seventy degrees, and eighty degrees, respectively, with respect to the horizontal axis. It is understood that other angles and/or angular differentials in any conceivable arrangement are also possible. The angular differential between each adjacent portion flat surface portion 220a, 220b, 220c, 220d, 220e, 220f may be substantially uniform. The term "substantially uniform," as used herein, refers to the angular difference between one angled flat surface portion and its adjacent angled flat surface portion being substantially the same for all angled flat surface portions 220a, 220b, 220c, 220d, 220e, 220f. The term "substantially," in this context, may mean that the angular differential between adjacent angled flat surface portions may differ by no more than approximately three degrees. For example, angled flat surface portion 220a, 220b, 220c, 220d, 220e, 220f may be designed to have an angular difference of approximately ten degrees with its adjacent angled flat surface portion. However, some of the angular differences in this case may be approximately seven degrees or up to approximately thirteen degrees. In further examples, the angular differences may range from between eight degrees and twelve degrees, nine degrees and eleven degrees, 9.5 to 10.5 degrees, etc. In further contexts, the term "substantially uniform" may mean that the angular differences between each adjacent angled flat surface portion angled flat surface portion 220a, 220b, 220c, 220d, 220e, 220f appear to be identical to an observer.

Referring to FIGS. 2 and 5 together, body 200 of test article 104 may include a third surface 230 extending between forward face 202 and rearward face 204. Third surface 230 may be opposite first surface 210 and thus may define an uppermost surface of body 200 (FIG. 2), as illustrated. Third surface 230 can be optionally structured as an attachment point for additional structures to test the build quality of AM system 100. Test article 104 thus may include a test member 232 (expanded view shown in FIG. 5) positioned on, and removably coupled to third surface 230 of body 200. A set of protrusions 234 may be similar or identical in their structure to protrusion 212 on first surface 210 of body 200, and thus may allow test member 232 to be detached from body 200 after its manufacture with AM system 100.

Test member 232 may be formed of the same material(s) as body 200, and may have a height $H_{TM}$ above body 200 that is less than, or at most approximately equal, to a height $H_C$ (FIG. 5 only) of AM component(s) 102 (FIG. 5) above build plate 118 (FIG. 1). Height $H_{TM}$ of test member 232 in FIG. 5 is depicted as being significantly less than height He of AM component 102. In other cases, the total height $H_{TS}$ (FIG. 2) of test article 104 may be approximately equal to height $H_c$ of AM component 102. In such circumstances, height $H_{TM}$ of test member 232 may represent a majority of the height of test structure 104. However embodied, height $H_{TM}$ of test member 232 may be based at least partially on the height of an AM component(s) 102 that is also formed on build plate 118. Test member 232 can be used, e.g., to test whether material density is uniform and/or at least equal to a target at several vertical positions (i.e., along the Z axis).

Returning to FIGS. 2-4, body 200 may include a fourth surface 240 extending between forward face 202 and rearward face 204 of body 200. Fourth surface 240 may be similar or identical to second surface 220, but may be shaped to examine the build quality of vertically-downward angled surfaces. Thus, fourth surface 240 may include a second plurality of angled flat surface portions (identified separately as 240a, 240b, 240c, 240d, 240e, 240f, respectively). Although six angled flat surface portions 240a, 240b, 240c, 240d, 240e, 240f are provided as an example in FIGS. 2-4, it is understood that as few as two angled flat surface portions, or several dozen or more angled flat surface portions, may be formed within fourth surface 240 of test article 104. Angled flat surface portions 240a, 240b, 240c, 240d, 240e, 240f, similar to portions 220a, 220b, 220c, 220d, 220e, may be considered "flat" by being substantially planar as discussed elsewhere herein with respect to other "flat" components.

Referring specifically to FIG. 4, each angled flat surface portion 240a, 240b, 240c, 240d, 240e, 240f may have a distinct angle with respect to the horizontal plane (i.e., the plane of X axis). The distinct angle of each angled flat surface portion 240a, 240b, 240c, 240d, 240e, 240f may be measured with respect to the horizontal axis of body 200. Projections of the horizontal axis of body 200 are shown in phantom for each angled flat surface portion 240a, 240b, 240c, 240d, 240e, 240f may have a distinct angle ($\lambda_1$, $\lambda_2$, $\lambda_3$, $\lambda_4$, $\lambda_5$, $\lambda_6$) with respect to the horizontal axis. According to a specific example, the angle of each adjacent flat surface portion with respect to the horizontal axis may increase or decrease by a predetermined amount in a sequential fashion.

Each angled flat surface portion 240a, 240b, 240c, 240d, 240e, 240f of test article 104 may indicate the ability of AM system 100 (FIG. 1) to form angled surfaces in AM component 102 (FIG. 1), and the build quality of such surfaces at predetermined angles. According to one example, angles $\lambda_1$, $\lambda_2$, $\lambda_3$, $\lambda_4$, $\lambda_5$, $\lambda_6$ may span from approximately thirty degrees to approximately eighty degrees with respect to the horizontal axis, although other ranges are possible. In the case of a thirty to eighty-degree range, each flat surface portion 240a, 240b, 240c, 240d, 240e, 240f may have an angular differential of, e.g., approximately ten degrees with respect to its adjacent portion. In this case, angles $\lambda_1$, $\lambda_2$, $\lambda_3$, $\lambda_4$, $\lambda_5$, $\lambda_6$ may be approximately thirty degrees, forty degrees, fifty degrees, sixty degrees, seventy degrees, and eighty degrees, respectively, with respect to the horizontal axis. It is understood that other angles and/or angular differentials in any conceivable arrangement are also possible. Thus, the angular differential between each adjacent portion flat surface portion 240a, 240b, 240c, 240d, 240e, 240f may be substantially uniform. Second surface 220 and fourth surface 240, together, allow test article 104 to indicate the build quality of upward-facing and downward-facing angled surfaces in AM component 102 (FIG. 1)

Body 200 further may include one or more curved surfaces 250 between forward face 202 and rearward face 204 to indicate the build quality of non-linear surfaces on AM component 102. Although two curved surfaces 250 are shown on body 200 as an example, it is understood that a larger or smaller number of curved surfaces 250 may be provided. Curved surface(s) 250 may extend, e.g., within the X-Z plane, between first surface 210 and second surface 220, between third surface 230 and fourth surface 240, and/or between further combinations of these surfaces in various alternative configurations. In embodiments where multiple curved surfaces 250 are included, the length, curvature, and/or other attributes of each curved surfaces 250 optionally may differ from each other to further indicate build quality of multiple curved geometries. Where included in body 200, each curved surface 250 may have a predefined radius of, e.g., approximately 50 millimeters (mm), or otherwise a radius that is approximately half of the horizontal length of its adjacent first surface 210 and/or third surface 230.

Test article 104 optionally may include one or more openings 260 within body 200. Opening(s) 260, where included, may extend from forward face 202 of body 200 to rearward face 204 of body 200. Opening(s) 260 may be of any conceivable shape and/or size, and may include a combination of flat, flat angled, and/or curved surfaces to indicate the build quality of such surfaces inside of opening(s) 260. To further indicate the build quality of AM component(s) 102, opening(s) 260 may be free of support members therein. That is, there may be no transversely extending components of test article 104 within opening(s) 260. Support members may be omitted from within opening(s) 260 to better indicate whether any similar openings within AM component(s) 102 that are inaccessible to inspectors, probes, etc., contain defects.

Referring now to FIGS. 2-4 and 6, embodiments of the disclosure may include a plurality of openings 262 within body 200. Plurality of openings 262 may differ from opening(s) 260, e.g., in that each opening of plurality of openings 262 features a distinct geometrical profile. The distinct geometrical profile of each opening in plurality of openings 262 may allow test article 104 to indicate build quality of multiple types of openings simultaneously, without using multiple bodies 200. As shown specifically in FIG. 6, plurality of openings 262 may feature geometries such as a rounded opening 262a, a partially rounded opening 262b (i.e., linear sides connected with curved portions), a partially rectangular opening 262c (i.e., linear sides connected with curved corners), and a rectangular opening 262d. Further geometries within plurality of openings 262 are possible, and the examples illustrated in FIGS. 2-4, and 6 are non-limiting examples. In further implementations, openings 262 may have similar shapes but distinct radii. For example, one or more of openings 262 may have no curved surfaces (e.g., ninety degree angles), with further openings having curved surfaces with gradually increasing radii (e.g., 0.25 millimeter (mm). 0.50 mm, 0.75 mm, etc.) The radii of adjacent openings 262 may increase linearly (e.g., by constant difference), and/or randomly or exponentially. Furthermore, openings 262 may have the same radii oriented upward, downward, and/or alternate horizontal directions, or may vary based on directional phasing in further implementations. However embodied, test article(s) 104 with plurality of opening(s) 262 can be mounted and inspected with the aid of tools such as microscopes, profilometers, etc., as described herein.

As shown in FIG. 2, test article 104 may additionally or alternatively include, e.g., one or more curvilinear channels 270 within body 200. Curvilinear channel(s) 270 may be formed in only one face of body 200 (e.g., forward face 202) without being formed in the other opposing face (e.g., rearward face 204). In further examples, curvilinear channel(s) 270 may be formed in forward face 202 and rearward face 204 of body 200. Curvilinear channel(s) 270, unlike opening(s) 260 and/or plurality of opening(s) 262, may extend at most partially into body 200 without extending from one face (e.g., forward face 202) to the other (e.g., rearward face 204). Curvilinear channel(s) 270, when formed in test article 104, may indicate the build quality of similar channels formed within AM component 102 (FIG. 1).

Curvilinear channel(s) 270 may offer the ability to test the build quality of thin walls within the structure of AM component(s) 102. To provide this feature, a portion 272 of forward face 202 between two curvilinear channels 270 may have a thickness that is at most equal to one of curvilinear channel(s) 270 (e.g., at most approximately five millimeters). Limiting the thickness of portion 272 to being at most equal to the size of its adjacent curvilinear channel(s) 270 may allow test article 104 to indicate the build quality of thin walls, without such walls being formed elsewhere on body 200. Moreover, in cases where rearward face 204 is free of curvilinear channel(s) 270, test article 104 can indicate the build quality of larger flat surfaces. Thus, at least a portion of test article 104 may be free of opening(s) 260, plurality of opening(s) 262, and/or curvilinear channel(s) 270, to indicate the build quality flat surfaces.

Figure 7:
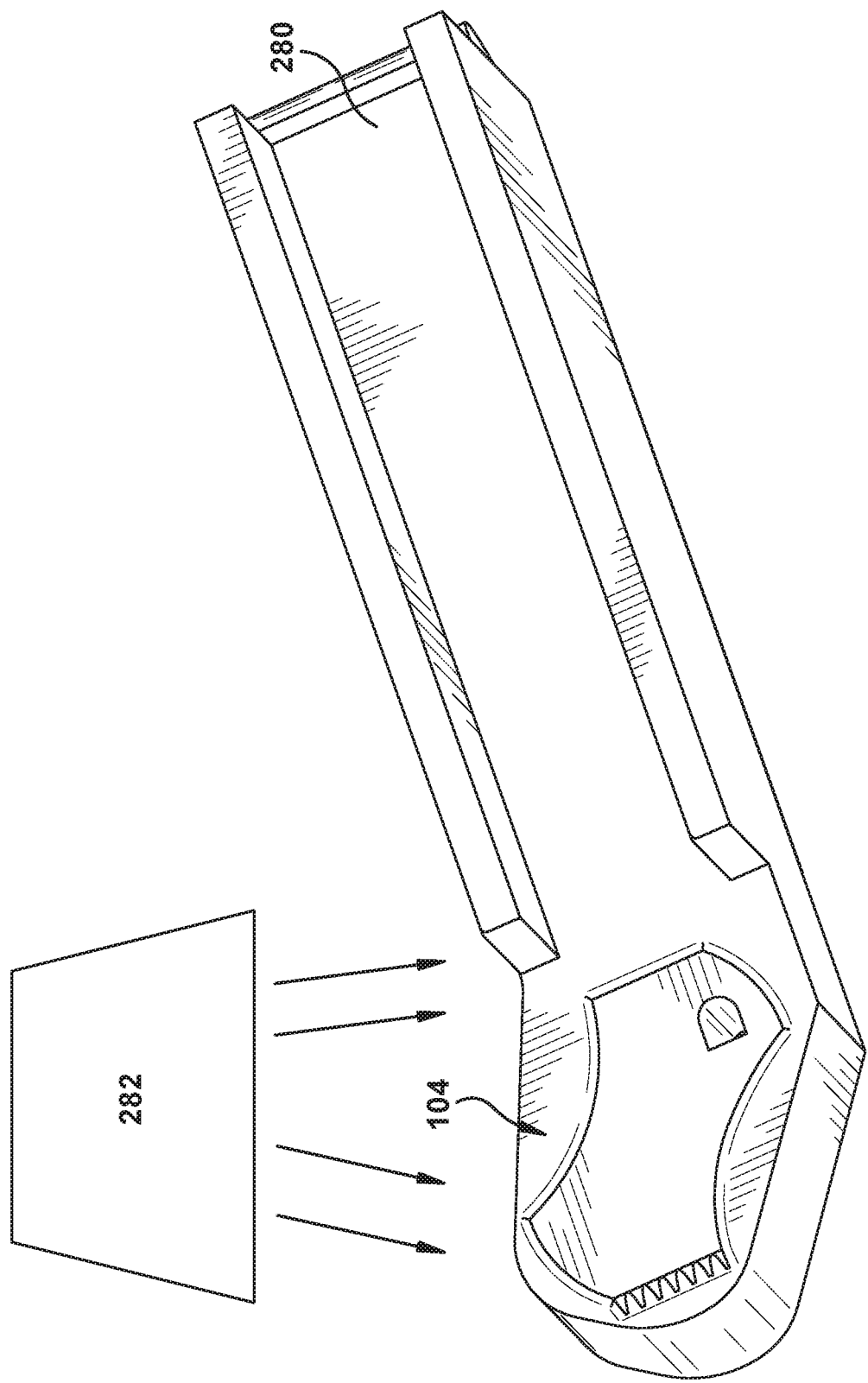
FIG. 7 shows a perspective view of the test article in a mounting fixture and measurable with a profilometer, according to embodiments of the disclosure.

Referring now to FIG. 7, methods of using test article 104 to evaluate the build quality of AM component(s) 102 (FIG. 1) are discussed. FIG. 7 depicts test article 104 after being detached from build plate 118 (FIG. 1). Test article 104 may be placed within a mounting fixture 280 shaped to receive test article 104 therein. Mounting fixture 280, in turn, may be placed within the operative scanning range of a profilometer 282 for measuring the physical profile and/or other features of test article 104. Profilometer 282 may take the form of any currently known or later developed instrument for measuring the surface profile of an object based on its topography. Profilometer 282 may be capable of measuring, e.g., surface roughness, curvature, flatness, etc. Profilometer 282 may be a contact-based instrument and/or a non-contact based instrument, such as a fiber-based and/or microscopy-based instrument, and/or any other device for performing the same or similar functions. However embodied, profilometer 282 may be capable of measuring any/all physical attributes of test article 104 discussed herein. Moreover, profilometer 282 may quantify such attributes for analysis to evaluate the build quality of AM component(s) 102 produced on the same build plate 118 and/or with the same AM component 100. In further implementations, test article 104 can be used for metallurgical analysis by being mounted in a polymer, polished, and viewed under a microscope. In still further implementations, test article 104 can be partially or fully destroyed and/or disassembled to test the resilience of AM component(s) 102 without damaging its material directly.

Figure 8:
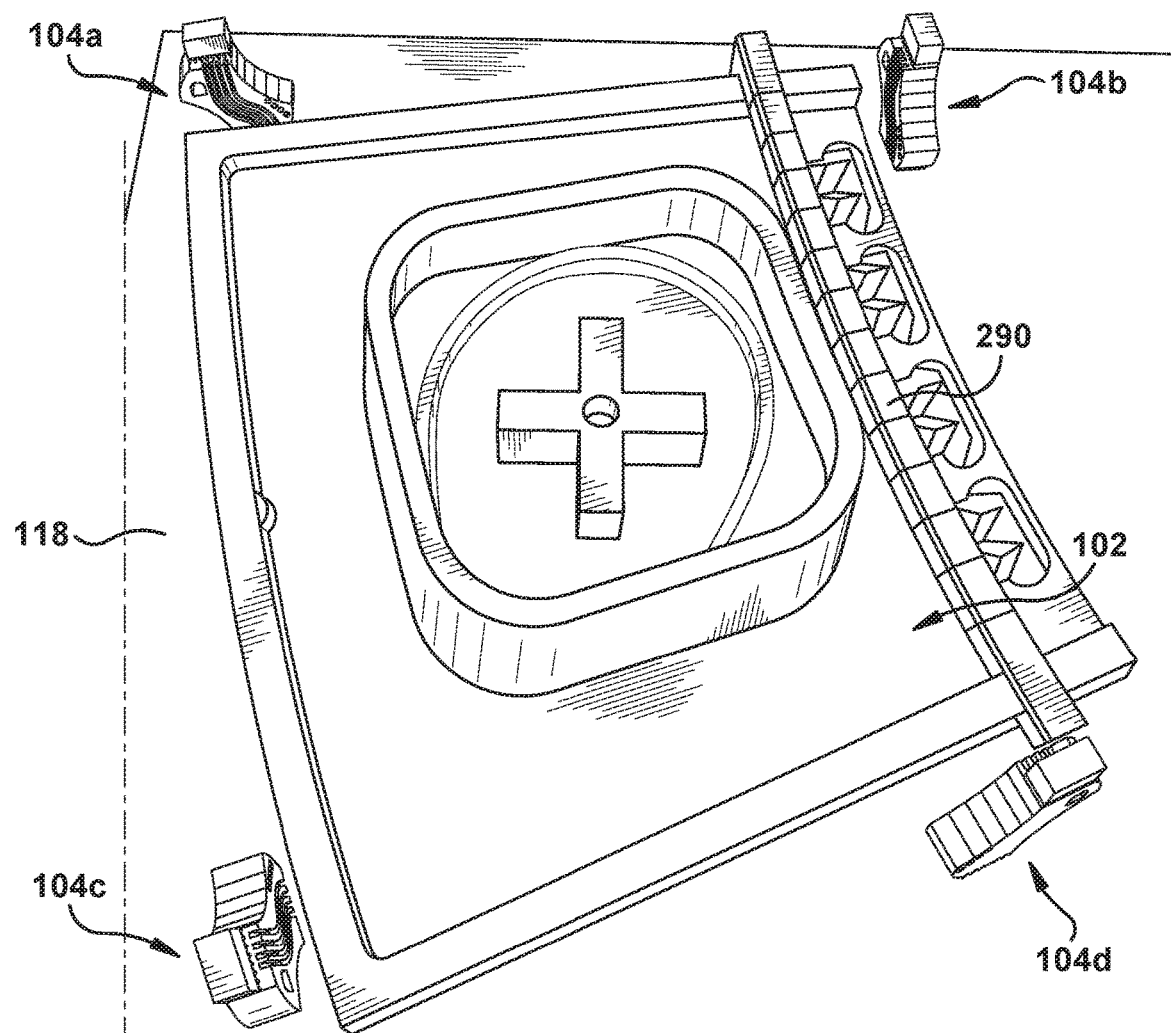
FIG. 8 shows a perspective view of a test article and a part concurrently formed by additive manufacture, according to embodiments of the disclosure.

As shown in FIG. 8, AM component(s) 102 may be produced concurrently with one or more test articles 104 to ensure that test articles 104 accurately represent an instance in which AM system 100 is used. In the example shown in FIG. 8, one AM component 102 and four test articles 104 are shown to be formed together on build plate 118. AM component 102 may include at least one angled surface 290, that may have the same orientation or a similar orientation to one or more of angled flat surface portions 220a, 220b, 220c, 220d, 220e, 220f, 240a, 240b, 240c, 240d, 240e, 240f, on test article(s) 104. However, it is understood that more than one AM component 102, and/or more or fewer than four test articles 104, may be formed on build plate 118. In this case, various attributes of AM component 102 (e.g., density, channel shape, wall shape, orientation of angled surfaces, etc.) may be determined based on test articles 104, and without direct analysis of AM component 102.

Figure 9:
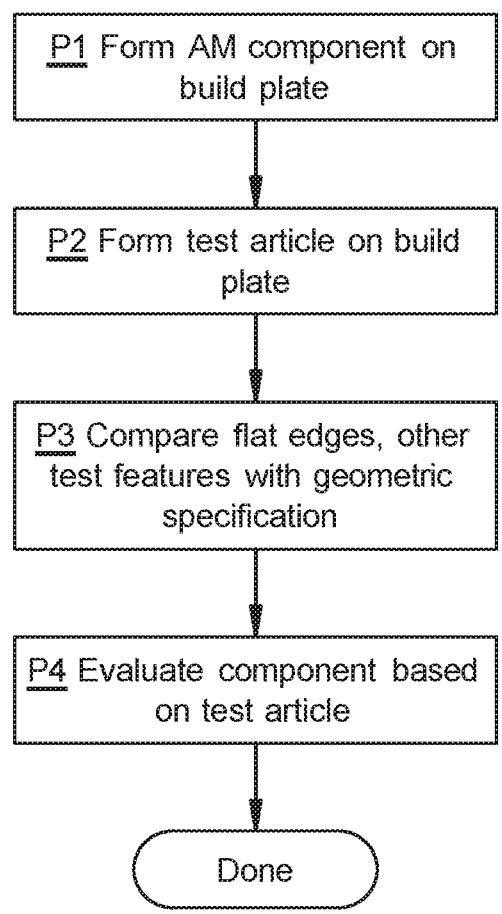
FIG. 9 shows an illustrative flow diagram of a method to test build quality in an additive manufacturing (AM) system, according to embodiments of the disclosure.

Referring to FIGS. 2, 8, and 9 together, in which FIG. 9 provides an illustrative flow diagram of methods for testing build quality in AM system 100, methods according to the disclosure are discussed in further detail. Process P1 in methods according to the disclosure may include forming AM component 102 with AM system 100, in which AM component 102 includes at least one angled surface. The angled surface(s) within AM component 102 may extend at any conceivable angle with respect to the horizontal axis (e.g., the X or Y axis direction in FIGS. 2, 8), and may be visible or non-visible to an observer after AM component 102 is manufactured. Process P2 in embodiments of the disclosure, which may occur concurrently with process P1, may include forming one or more test articles 104 on build plate 118. Test article 104 may include any or all of the features shown in FIGS. 2-6 as discussed herein. Test article 104, in a specific example, may include at least first surface 210 removably coupled to build plate 118. Test article 104 may also include second surface 210 including plurality of angled flat surface portions 220a, 220b, 220c, 220d, 220e, 220f each having a distinct angle with respect to the horizontal plane as discussed herein. As also discussed herein, the angular differential between each adjacent flat surface portion 210a, 210b, 210c, 210d, 210e, 210f may be uniform (e.g., approximately ten degrees).

Process P3 in methods of the disclosure may include comparing one or more attributes of test article 104 (e.g., at least one of angled flat surface portions 220a, 220b, 220c, 220d, 220e, 220f) with a geometric specification of AM component 102. The term "geometric specification," as used herein, may refer to a library of target and/or ideal parameters for test structure 104, indicating the absence or likely absence of defects in AM component 102. The geometric specification may take the form of, e.g., a look-up table, algorithm, and/or other solution for comparing physical parameters (measured, e.g., using profilometer 282 (FIG. 7)) with reference values. The geometric specification may include one or more of, e.g., target angular orientations, target densities, geometrical profiles, curvatures, and/or other attributes. In some implementations, the geometric specification may be included within, e.g., control system 120, and/or internal memory of profilometer 282.

Process P4 of embodiments of the disclosure may include evaluating whether AM component 102 includes a defect, based on the comparison between test article 104 and the geometric specification. It is emphasized that the evaluation of whether AM component 102 includes defects may be based solely on the comparison between test article 104 and the geometric specification, and not on any direct analysis of AM component(s) 102 or portions thereof (e.g., angled surface(s) 290). The specific attributes being compared in process P3 for evaluation in process P4 may differ between implementations. In one example, process P3 may include comparing an angular orientation of angled flat surface portions 220a, 220b, 220c, 220d, 220e, 220f, and/or angled flat surface portions 240a, 240b, 240c, 240d, 240e, 240f with reference values in the geometric specification. If the measured angular orientations differ from the target value(s) in the geometric specification via the evaluating in process P4, AM component 102 may be deemed to have a defect. In another example, process P3 may include comparing a density of test member 232 of AM component 102 with a reference density in the geometric specification. If the measured density differs from the target density(ies) in the geometric specification via the evaluating in process P4, AM component 102 may be deemed to have a defect. In still another example, if a channel curvature of curvilinear channel(s) 270 of test article 104 differ from target curvature(s) in the geometric specification via the evaluating in process P4, AM component 102 may be deemed to have a defect. In yet another example, if a geometrical profile of opening(s) 260 and/or plurality of opening(s) 262 differs from a target profile in the geometrical specification by a threshold amount, AM component 102 may be deemed to have a defect. It is understood that such examples are non-limiting, and that any conceivable attribute of test article 104 may be compared with one or more corresponding values in the geometrical specification to evaluate whether AM component 102 has any defects.

Embodiments of the disclosure provide several technical and commercial advantages, some of which are discussed herein as examples. Test article 104 provides a single structure with several physical attributes that may be analyzed (e.g., using profilometer 282) without direct analysis of AM component 102 being required. The analysis of test article 104 may circumvent partial disassembly and reassembly of AM component 102, and/or other operations and/or equipment that would be needed to directly analysis sensitive physical structures of AM component 102. Additionally, test article 104 may be manufactured for several kinds of AM components 102 without any modifications. The compact size of test article 104 relative to AM components 102 also may require little use of additional manufacturing material. The manufacturing and analysis of test article 104 thus may be easily integrated into a wide variety of manufacturing procedures for a similarly diverse group of machines and/or technical applications.

It should be noted that in some alternative implementations, the acts described may occur out of the order noted or, for example, may in fact be executed substantially concurrently or in the reverse order, depending upon the act involved. Also, one of ordinary skill in the art will recognize that additional processes may be added.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A test article formed by additive manufacturing (AM), the test article comprising:
a body having a forward face and a rearward face opposite the forward face, the body including:
a first surface extending between the forward face and the rearward face of the body, and including a plurality of protrusions for removable coupling of the body to a build plate, the plurality of protrusions including thin supports of additively manufacturable material with arcuate openings between the thin supports of additively manufacturable material coupling the body to the build plate; and
a second surface on the body extending between the forward face and the rearward face of the body, the second surface including a plurality of angled flat surface portions, each of the plurality of angled flat surface portions having a distinct angle with respect to one of the forward face of the body and the rearward face of the body, wherein an angular difference between each adjacent angled flat surface portion in the plurality of angled flat surface portions is substantially uniform.

2. The test article of claim 1, further comprising:
a third surface between the forward face and the rearward face of the body, opposite the first surface; and
a test member removably coupled to the third surface of the body, wherein a height of the test member extends_above the third surface.

3. The test article of claim 1, further comprising an opening within the body, the opening extending from the forward face of the body to the rearward face of the body.

4. The test article of claim 3, wherein the opening within the body comprises a plurality of openings within the body, and wherein each of the plurality of openings within the body has a distinct geometrical profile.

5. The test article of claim 1, further comprising at least one curvilinear channel within the forward face of the body, and wherein the at least one curvilinear channel extends into the body, wherein the rearward face is free of channels therein.

6. A test article formed by additive manufacturing (AM), the test article comprising:
a body having a forward face and a rearward face opposite the forward face;
a first surface on the body extending between the forward face and the rearward face of the body, and including a plurality of protrusions for removable coupling of the body to a build plate, the plurality of protrusions including thin supports of additively manufacturable material with arcuate openings between the thin supports of additively manufacturable material coupling of the body to the build plate;
a second surface on the body extending between the forward face and the rearward face of the body, the second surface including a first plurality of angled flat surface portions, each of the first plurality of angled flat surface portions having a distinct angle with respect to one of the forward face of the body and the rearward face of the body, wherein an angular difference between each adjacent angled flat surface portion in the first plurality of angled flat surface portions is substantially uniform;
a third surface on the body extending between the forward face and the rearward face, opposite the first surface;
a fourth surface on the body extending between the forward face and the rearward face, opposite the second surface, the fourth surface including a second plurality of angled flat surface portions, each of the second plurality of angled flat surface portions having a distinct angle with respect to one of the forward face of the body and the rearward face of the body, wherein an angular difference between each adjacent angled flat surface portion in the second plurality of angled flat surface portions is substantially uniform; and
at least one curved surface portion on the body between the forward face and the rearward face to indicate the build quality of non-linear surfaces on the test article, and extending between the first surface and one of the second surface or the third surface.

7. The test article of claim 6, further comprising a test member removably coupled to the third surface of the body, wherein a height of the test member extends_above the third surface.

8. The test article of claim 6, wherein each distinct angle of the first or second plurality of angled flat surface portions is between approximately thirty degrees and approximately eighty degrees with respect to the horizontal plane.

9. The test article of claim 8, wherein the angular difference between each adjacent angled surface portion in the first or second plurality of angled flat surface portions is approximately ten degrees.

10. The test article of claim 6, further comprising an opening within the body, the opening extending from the forward face of the body to the rearward face of the body.

11. The test article of claim 10, wherein an interior of the opening within the body is free of support members.

12. The test article of claim 10, wherein the opening within the body comprises a plurality of openings within the body, and wherein each of the plurality of openings within the body has a distinct geometrical profile.

13. The test article of claim 6, further comprising at least one curvilinear channel within the forward face of the body, and wherein the at least one curvilinear channel extends into the body.

14. The test article of claim 13, wherein the at least one curvilinear channel includes a plurality of curvilinear channels, and wherein a portion of the forward face of the body between two of the plurality of curvilinear channels has a thickness that is less than or equal to a depth of one of the plurality of curvilinear channels.

15. The test article of claim 13, wherein the rearward face of the body is free of channels therein.

* * * * *